United States Patent
Fischer et al.

(10) Patent No.: US 6,626,059 B1
(45) Date of Patent: Sep. 30, 2003

(54) GEARBOX WITH TORQUE DIVISION, IN PARTICULAR FOR A HELICOPTER ROTOR DRIVE

(75) Inventors: Manfred Fischer, Markdorf (DE); Bernard Hunold, Friedrichshafen (DE); Hans Håse, Friedrichshafen (DE); Martin Messmer, Friedrichshafen (DE)

(73) Assignee: ZF Luftfahrttechnik GmbH, Calden (DE)

( * ) Notice: Subject to any disclaimer, the term of this patent is extended or adjusted under 35 U.S.C. 154(b) by 0 days.

(21) Appl. No.: 09/486,095

(22) PCT Filed: Aug. 17, 1998

(86) PCT No.: PCT/EP98/05183
§ 371 (c)(1),
(2), (4) Date: Jun. 5, 2000

(87) PCT Pub. No.: WO99/10236
PCT Pub. Date: Mar. 4, 1999

(30) Foreign Application Priority Data

Aug. 22, 1997 (DE) .......................................... 197 36 572

(51) Int. Cl.[7] .............................. F16H 1/14; F16H 37/06
(52) U.S. Cl. ......................................... 74/417; 74/665 A
(58) Field of Search .......................... 74/410, 416, 417, 74/665 A, 665 C, 665 F, 665 H, 665 L, 665 M, 665 N

(56) References Cited

U.S. PATENT DOCUMENTS

| | | | |
|---|---|---|---|
| 2,908,187 A | 10/1959 | Saari | |
| 2,935,885 A | 5/1960 | Saari | |
| 3,349,636 A * | 10/1967 | Colpo | 74/417 X |
| 3,548,673 A * | 12/1970 | Suchocki | 74/417 X |
| 3,564,937 A | 2/1971 | Soloviev et al. | 74/665 |
| 4,272,041 A * | 6/1981 | Mabuchi et al. | 244/17.21 |
| 4,489,625 A | 12/1984 | White | 74/665 C |
| 4,586,219 A | 5/1986 | Blach et al. | |
| 4,761,114 A * | 8/1988 | Barland | 74/665 M X |
| 4,932,280 A | 6/1990 | Becker et al. | |
| 5,135,442 A | 8/1992 | Bossler, Jr. | 74/665 B |
| 5,178,028 A | 1/1993 | Bossler, Jr. | |
| 5,182,960 A * | 2/1993 | Chary | 74/117 |
| 5,472,386 A * | 12/1995 | Kish | 475/338 |
| 5,802,918 A * | 9/1998 | Chen et al. | 74/665 A |
| 5,807,202 A * | 9/1998 | Sammataro | 74/665 A X |
| 6,364,611 B1 * | 4/2002 | Matsuda et al. | 74/410 X |

FOREIGN PATENT DOCUMENTS

| | | | |
|---|---|---|---|
| DE | 34 23 983 A | | 1/1986 |
| DE | 3705064 | * | 5/1988 |
| EP | 04 57 711 B1 | | 5/1991 |
| EP | 07 53 456 A1 | | 1/1996 |
| GB | 1 310 417 | | 3/1973 |
| GB | 1 393 984 | | 5/1975 |
| GB | 2 288 651 A | | 10/1995 |
| WO | 95 32895 A1 | | 12/1995 |
| WO | 97 22817 A | | 6/1997 |

OTHER PUBLICATIONS

Richard Bryant and Darle Dudley, Which Right–Angle Gear System, 1970, pp. 44–55.*

* cited by examiner

Primary Examiner—Roger Pang
(74) Attorney, Agent, or Firm—Davis & Bujold, P.L.L.C.

(57) ABSTRACT

The invention relates to a transmission with torque division for a helicopter rotor drive. In a manner known per se, in the transmission a first power transmission branch has a first rotatable driving pinion (6) which is in constant engagement with a first toothed wheel (2) on the output side. At least one other power transmission branch has one other driving pinion (9) co-axial to the first driving pinion (6) and in constant engagement with one other toothed wheel (4) on the output side co-axial to the first toothed wheel (2) on the output side. One torsionally elastic member is arranged in the torque flow of each power transmission branch. The torsion-resistance of the torsionally elastic members determines the load proportions of the power transmission branches. The inventive transmission makes possible a high power density with small installation space, light weight and a small number of functional elements.

22 Claims, 4 Drawing Sheets

GEARBOX WITH TORQUE DIVISION, IN PARTICULAR FOR A HELICOPTER ROTOR DRIVE

BACKGROUND OF THE INVENTION

The invention relates to a transmission with torque division in particular for a helicopter rotor drive.

Such transmissions have the advantage that the torque to be transmitted is distributed among several gear engagements acting in parallel so that the gear forces per gear engagement are reduced and a higher power density can be achieved than in transmissions having no torque division.

In transmissions without torque division, increasing the transmissible torque by larger tooth width is possible only to a limited extent. In spur gears, there appears the danger of edge wear caused by housing deformation or imprecision in the production. In broad bevel gears or crown gears, problems appear with the tooth shape and it is possible above a certain tooth width to produce spiral bevel gears only at considerable expense or not at all.

U.S. Pat. No. 5,135,442, regarded as the closest art, has disclosed an angle transmission in which the power of a driving pinion is divided between two bevel gears lying opposite to each other on both sides of the pinion. Each one of the bevel gears is non-rotatably connected, via a shaft, with one other pinion. The added pinions are in simultaneous tooth engagement with a summarizing gear. In this solution, the large number of parts is a disadvantage.

For higher one-step ratios in the divided stage, a larger axial distance of the shafts and, accordingly, larger installation space would be needed.

The problem on which the invention is based is to provide a transmission with torque division which allows a high ratio and high power density in small installation space with light weight and a small number of functional elements.

SUMMARY OF THE INVENTION

This problem is solved, according to the invention, by the fact that a first power transmission branch has, as known per se, a first rotatable driving pinion which is in constant engagement with a first toothed wheel on the output side and at least one other power transmission branch has one other driving pinion co-axial to the first driving pinion which is in constant engagement with one other toothed wheel on the output side co-axial to the first toothed wheel on the output side.

The co-axial arrangement is very favorable in relation to number of parts and required space.

In an advantageous development of the invention, a torsionally elastic member is disposed in the torque flow of each of the power transmission branches. Hereby the power or torque distribution to the two power transmission branches can be definitely controlled and there is achieved an insensitivity to the deformations which can be produced in driving operation due, e.g. to static or thermal loads.

When the ratio of the torsional remittances of the torsionally elastic members is substantially corresponding to the (rolling) radial ratio of the associated driving pinion (the same ratio applies to the toothed wheels on the output side), the magnitude of the tangential forces in the tooth engagements of the power transmission branches is substantially equal so that when the tooth widths are equal a uniform load of the teeth is obtained. In this connection, the expression torsional resistance is understood as measure for the torque with which the part concerned counteracts a torsion around a certain angle.

A compact system is obtained when the torsionally elastic members between a branching point on the input side and the driving pinions are in co-axial pinion shifts disposed within each other with a torsionally resilient design, it is advantageous that the driving pinion of the radially outer pinion shaft be torsionally supported on the radially inner pinion shaft.

On the branching point, the pinion shafts are preferably non-rotatably interconnected by a positive fit spline, e.g. a toothed shaft spline. In an advantageous development, torsion resilient sections lie between the branching point and the pinion teeth so that the pinions are rotatable against each other under load around a load-dependent angle.

A very simple, high-load and reliable rotatable support of the driving pinion of the radially outer pinion shaft upon the radially inner pinion shaft is obtained when the support is designed as sliding bearing, the bearing races being integrated in the driving pinion or the pinion shaft. The supporting properties can be advantageously affected by a non-ferrous metal coating of the bearing races.

A thin-walled hollow shaft section is an advantageous development of a torsion-resilient shaft section in which the tensions are minimal compared to alternative developments. Especially in the radially outer pinion shaft, the wall thickness must be selected small to obtain torsional resilience. The polar surface inertia torque of the cross-section of the radially inner shaft is anyway substantially smaller due to the great dependence on the radius.

An alternative development of a torsion-resilient shaft section has, e.g. longitudinally oriented recesses. In other cases, it can be advantageous to produce the outer pinion shaft of a material of low thrust module, such as titanium.

To adjust the load portions of the power transmission branches, it is advantageous that the relative rotational position of the pinion shafts be adjustable at least once. The adjustability can be achieved, for instance, by providing on the branching point an helical-cut spline and the axial position of both pinion shafts being adjustable by means of spacers. But adhesive joints or frictionally coupled, pressed connections on the branching point or between pinion shaft and pinion, likewise, are possible so that the rotational position can be adjusted once during the assembly.

A development where at least one of the driving pinions is designed forming a single piece with the pinion shaft is advantageous with regard to the number of parts.

The inventive transmission can be used in several advantageous constellations.

An embodiment in which the toothed wheels on the output side are designed as cylindrical spur gears is advantageously suited to a parallel arrangement of input and output of this transmission stage.

When the toothed wheels on the output side are designed as bevel gears, the most diverse angles can he obtained between input and output of the transmission.

When the toothed wheels on the output side are designed as crown gears and the cylindrical driving pinions are disposed forming a right angle therewith, axial movements of the driving pinions do not act upon the radial teeth play.

With driving pinions designed as bevel gears, it is possible to adjust the teeth play by setting the axial position, e.g. by means of spacers. Combined with toothed wheels on the output side likewise designed beveled—as described—the most diverse angles can be implemented between input and output of the transmission, the extensions of the axles normally having a common intersection point.

Desirable in other installation cases is a center distance which is made possible when the driving pinion and the toothed wheels on the output side form hypoid pairs.

The known advantages of helical-cut teeth or spiral teeth are a higher degree of contact and less teeth noises. By an axial displacement of an helical-cut pinion, along its axis of rotation, it is favorably possible to affect the load portion of the power transmission branch concerned.

It is advantageous that the helix angle of the wheel pairs of the power transmission branches have opposite directions. In this manner, a compensation of axial forces takes place so that a smaller axial bearing is sufficient. If the pinion shafts are fixed axially to each other, but supported as a unit with axial play against the toothed wheels on the output side, there appears a power-distribution effect dependent on the helix angles.

Regarding an easy assembly, it is advantageous that the helix angles of the wheal pairs of the power transmission branches have the same sense of direction.

For kinematic reasons, it is necessary that the ratios of the power transmission branches be exactly alike. Especially simple assembly conditions are obtained when the driving pinions and the toothed wheels on the output side of the power transmission branches each have the same number of teeth. When the different power transmission branches have different rolling radii, it is advantageous that the ratio of the modules of the teeth substantially corresponds to the (rolling) radii ratio. Favorable teeth shapes are possible in this manner.

For higher total ratios, it is favorable that a transition stage be provided on the output side.

Finally, it is advantageous that one pinion of one power take-off unit be constantly engaged with one of the toothed wheels on the output side. The pinion creates a permanent operative connection of the tail rotor drive with the main rotor.

BRIEF DESCRIPTION OF THE DRAWINGS

The invention is explained in detail with reference to the enclosed drawings wherein.

DESCRIPTION OF THE PREFERRED EMBODIMENTS

Figure 1:
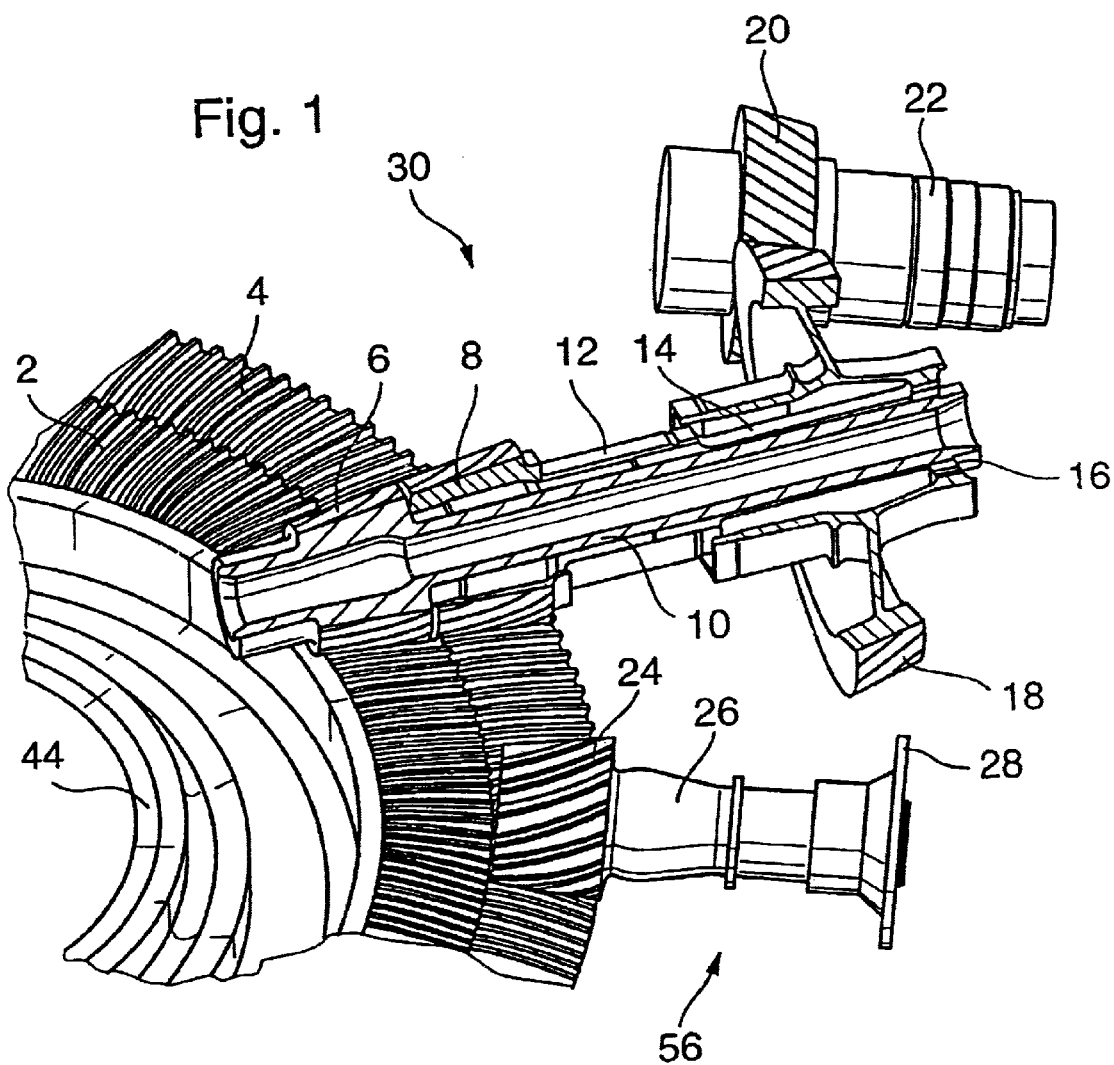
FIG. 1 shows a perspective view of parts of the inventive transmission.

FIG. 1 shows parts of the inventive transmission in perspective view. Both toothed wheels 2, 4 on the output side are non-rotatably connected with each other and with the rotor mast 44 around the axis of which they are rotatably supported. The toothed wheel 2 output of a first power transmission branch is in constant engagement with the pinion 6. Co-axially to the latter is situated a driving pinion 8 of a second power transmission branch which is in constant engagement with the toothed wheel 4 on the output side.

The pinion shafts 10, 12 designed as hollow shafts are positioned co-axially within each other and non-rotatably interconnected only at a branching point 16 on the output side. In the area between the branching point 16 and the engagements of the pinions 6, 8 with the toothed wheels 2, 4, the pinion shafts 10, 12 have a certain torsional elasticity. In addition, the radially outer pinion shaft 12 has a relatively thin-walled area 14. The radially inner pinion shaft 10 is somewhat longer and has a smaller radius so that even without a special thin-walled area, it can already have a desired torsional elasticity. The torsional elasticity of both shafts 10, 12 are measured, so that in the transmission shown, a torsional elasticity of approximately 0.4° is possible under full load.

The ratio of the torsional resistances of the torsionally elastic members, the pinion shafts, corresponds substantially to the rolling radial ratio of the associated driving pinions 6, 8 so that a uniform tooth load is achieved. In the embodiment shown, the wheels 2,4, 6, 8 are spiral cut, the wheels of both power transmission branches having the same sense of direction or sense of direction of the helix angle. The pinions 6, 8 and the toothed wheels 2, 4 each have the same number of teeth, respectively, the ratio of the modules substantially corresponding to the rolling radial ratio. The geometry of the teeth of both power transmission branches can be advantageously optimized separately from each other.

In FIG. 1 is also shown a transition stage formed by bevel gears 18 and 20, wherein the wheel 18 is non-rotatably connected with both pinion shafts at the branching point 16 and the wheel 20 is connected by the shaft 22 with a drive mechanism (not shown). The pinion 24 of a power take-off unit 56, leading to the tail rotor, is constantly engaged with the toothed wheel 4 on the output side. A permanent operative connection of main rotor and tail rotor is thereby created by the shaft 26 and the flange 28.

Independently of the transmission 30, the power take-off unit is advantageously designed as a separate module with its own housing (not shown), whereby easy adaptability for different installations can be achieved.

Figure 2:
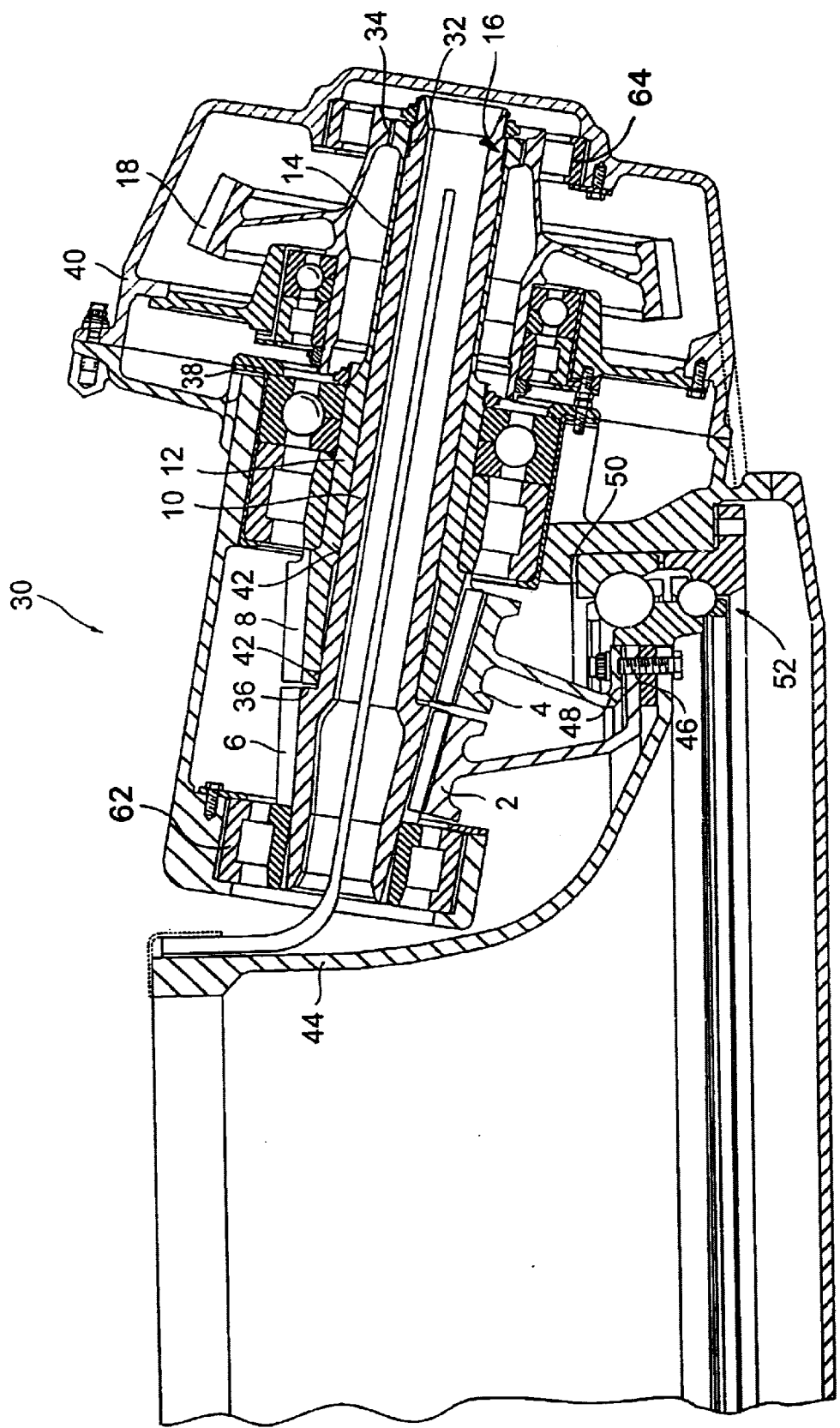
FIG. 2 shows a longitudinal view though the inventive transmission with bevel toothed wheels.

In FIG. 2, the parts, corresponding to FIG. 1, are given the same reference numerals. At the branching point 16, both pinion shafts 10, 12 are interconnected positively and free of relative rotational play by a shaft spline connection 32. Torque is transmitted from the bevel gear 18 to the two pinion shafts 10, 12, likewise by a shaft spline connection 34 situated in the same axial area as the shaft spline connection 32. The shaft spline connections 32, 34 allow axial displacement of the non-rotatably connected parts, the spacers 36, 38 serve to establish the axial positions of both pinions 6, 8 relative to each other and opposite to the housing 40 which is made of light metal or weight-sparingly of fibrous compact material.

Under load both pinions 6, 8 are reciprocally rotatable due to the torsional elasticity of the pinion shafts 10, 12. In the embodiment shown, the radially outer pinion 8 is rotatably supported upon the radially inner pinion shaft 10. The outer pinion shaft 10 is also supported on by first end bearing 62. The inner pinion shaft 10 is supported at the opposed end, by a second end bearing 64 to facilitate rotation of the pinion shafts 10, 12 relative to the housing 40. Between pinion 8 and shaft 10 are fitted surfaces which may be a non-ferrous metal in order to improve the supporting properties on their surfaces. The sliding bearing formed thereby, in which the bearing races 42 are integrated into the driving pinion or the pinion shaft, has the advantages of a small number of parts, freedom of play and high load capacity.

In the embodiment shown, both driving pinions 6, 8 and the toothed wheels 2, 4 on the output side are designed as bevel gears whereby a desired angle can be obtained between input and output. To reduce the number of parts, the pinions 6, 8 form a single piece, respectively, with the pinion shafts. 10, 12.

The toothed wheels 2, 4 on the output side are non-rotatably connected by fastening elements 46 with the rotor mast 44. Spacers 48, 50 make possible the adjustment of the vertical position of the wheels 2, 4 relative to each other and the adjustment of the vertical position of the transmission 30 relative to the rotor bearing 52 and rotor mast 44.

Figure 3:
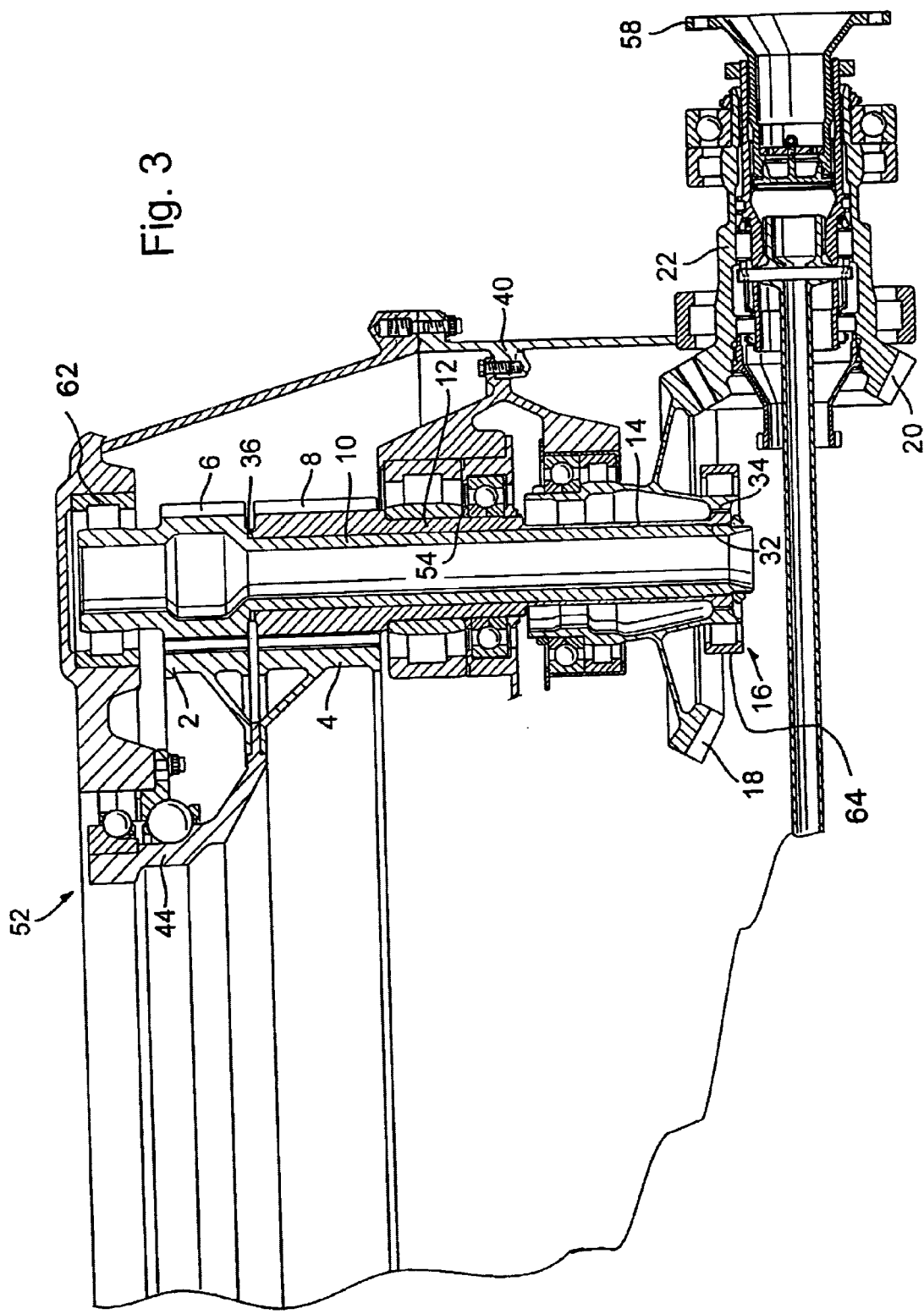
FIG. 3 shows a longitudinal view through the inventive transmission with cylindrical toothed wheels.

FIG. 3 shows one other embodiment of an inventive transmission in which both the toothed wheels 2, 4 on the output side and the driving pinions 6, 8 are designed as cylindrical spur gears and the axis of rotation of the pinions is parallel to the axis of rotation of the toothed wheels on the output side. Parts corresponding to each other are given the same reference numerals. It is advantageous in this arrangement that the radial play of the teeth between the wheels 2, 6 and 4, 8 is independent of the axial position of both pinions 6, 9. The wheels are helical cut so that the adjustment of the axial position of the pinions 6, 8 by means of the spacers 36, 54 can be used to adjust the load portions of the individual. power transmission branches.

Figure 4:
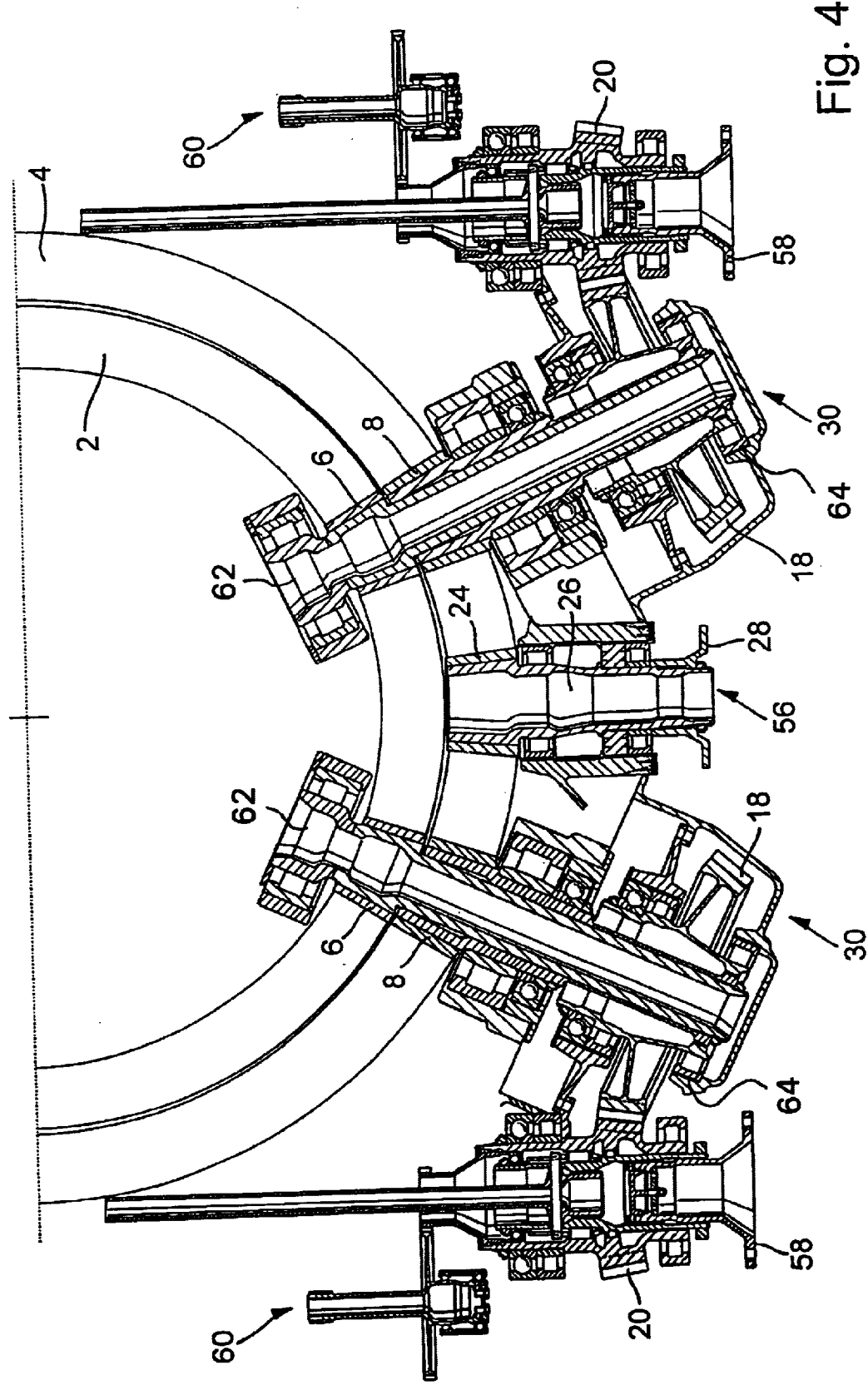
FIG. 4 shows a helicopter rotor drive for two prime movers.

FIG. 4 finally shows a representation of an inventive helicopter rotor main drive in which are provided two primer movers (not shown). Two pinions 6, 8 are simultaneously engaged respectively with the two toothed wheels 2,4 on the output side. Each power divided transmission 30 has one input flange for tying a prime mover (not shown).

The power take-off unit 56, with the rotatably supported pinion 24 of a pinion shaft 26 and a flange 28, is designed as separate module and serves to drive tail rotor (not shown). In the embodiment shown, the axes of rotation of the pinions 6, 8, 24, respectively, cut the axes of rotation of the toothed wheels 2, 4 on the output side, which is equal to the axis of rotation of the rotor mast. Depending on installation conditions, it can be desirable to position the pinion axes offset in parallel relative to the representation. In this case the pinions of the toothed wheels 2, 4 on the output side are provided with beveloid teeth.

The power take-off 60 is driven by a spur gear step and serves to drive auxiliary units, such as oil, pumps or generators.

The embodiments show the present transmissions with two power transmission branches. It Is easily possible to provide more than two co-axial driving pinions and also several co-axial toothed wheels on the output side in order to distribute the driving power over still more engagements.

Compared to a known system without power distribution with the same transmissible torque, an inventive transmission has a smaller diameter by about 15% or with the same diameter a transmissible torque substantially 50% greater, whereby is also particularly obtained a substantial advantage in weight which acts especially favorably when used in the helicopter. But the expert will also find other uses for the proposed power divided transmission construction.

| Reference numerals | |
|---|---|
| 2 | first toothed wheel on output side |
| 4 | second toothed wheel on output side |
| 6 | driving pinion |
| 8 | driving pinion |
| 10 | pinion shaft |
| 12 | pinion shaft |
| 14 | thin-walled torsionally elastic section |
| 16 | branching point |
| 18 | bevel wheel |
| 20 | bevel wheel |
| 22 | input shaft |
| 24 | power take-off pinion |
| 26 | power take-off shaft |
| 28 | power take-off flange |
| 30 | transmission, input side |
| 32 | spine connection |
| 34 | spline connection |
| 36 | spacer |
| 38 | spacer |
| 40 | housing |
| 42 | bearing races |
| 44 | rotor mast |
| 46 | fastening elements |
| 48 | spacer |
| 50 | spacer |
| 52 | main rotor bearing |
| 54 | spacer |
| 56 | power take-off |
| 58 | input flange |
| 60 | power take-off |
| 62 | first end bearing |
| 64 | second end bearing |

What is claimed is:

1. A transmission (30) for a helicopter rotor drive having at least one prime mover provided with at least first and second power transmission branches, a housing (40) accommodating the first and second power transmissions, the first power transmission branch having a first rotatable driving pinion (6) in constant engagement with a first toothed output gear (2) and the second power transmission branch having a second driving pinion (8) in constant engagement with a second toothed output gear (4), co-axial with the first toothed output gear (2), and the first and second driving pinions (6, 8) being located adjacent one another;

wherein a first pinion shaft (10) interconnects the first driving pinion (6) with an interconnecting point (16) and a second pinion shaft (12) interconnects the second driving pinion (8) with the interconnecting point (16), whereby the first and second toothed output gears (2, 4) are non-rotatably interconnected with one another, said first and second pinion shafts (10, 12) are torsionally elastic such that a ratio of torsional resistance of said first and second pinion shafts (10, 12) substantially corresponds to a rolling radial ratio of the associated driving pinions (6, 8), and a first end of the first pinion shaft (10) is supported by a first bearing (62) and a second opposed end of the first pinion shaft (10) is supported by a second bearing (64), with the first and second driving pinions (6, 8) located between the first and second bearings (62, 64), to facilitate rotation of the first and second pinion shafts (10, 12) relative to the housing (40); and said second driving pinion (8) of said second pinion shaft (12) is support upon said first pinion shaft (10) by a sliding bearing, and the sliding bearing has races (42) which are integrated radially within said second driving pinion (8) and said first pinion shaft (10).

2. The transmission according to claim 1, wherein at least one of the first and second pinion shafts (10, 12) has a thin-walled hollow shaft section (14) in order to provide the desired torsional elasticity.

3. The transmission according to claim 1, wherein said first and second pinion shafts (10, 12) comprise different materials which differ in order to produce the desired torsional elasticity.

4. The transmission according to claim 1, wherein said second driving pinion (8) is mounted on said second pinion shaft (12) and is rotatably supported upon said first pinion shaft (10).

5. The transmission according to claim 1, wherein the interconnection point (16) is formed by a non-rotatable and play-free spline connection between said first and second pinion shafts (10, 12).

6. The transmission according to claim 1, wherein a relative rotational position of said first and second pinion shafts (10, 12) is adjustable.

7. The transmission according to claim 1, wherein at least one of said first and second driving pinions (6, 8) forms a unitary structure with the corresponding pinion shaft (10, 12).

8. The transmission according to claim 1, wherein said first and second toothed output gears (2, 4) are cylindrical spur gears.

9. The transmission according to claim 1, wherein said first and second toothed output gears (2, 4) are bevel gears.

10. The transmission according to claim 1, wherein said first and second toothed output gears (2, 4) are crown gears.

11. The transmission according to claim 8, wherein said first and second driving pinions (6, 8) are cylindrical spur gears.

12. The transmission according to claim 9, wherein said first and second driving pinions (6, 8) are bevel gears.

13. The transmission according to claim 1, wherein said first and second said driving pinions (6, 8) and said first and second toothed output gears (2, 4) form first and second pairs of hypoid gears.

14. The transmission according to claim 1, wherein both said first and second toothed output gears (2, 4) and said first and second said driving pinions (6, 8) are helical cut.

15. The transmission according to claim 10, wherein both said first and second toothed output gears (2, 4) and said first and second said driving pinions (6, 8) are spiral cut.

16. The transmission according to claim 15, wherein a helix angle of spiral teeth of respective pairs of said first and second toothed output gears (2, 4) and said first and second said driving pinions (6, 8) spiral in an opposite direction.

17. The transmission according to claim 15, wherein a helix angle of spiral teeth of respective pairs of said first and second toothed output gears (2, 4) and said first and second said driving pinions (6, 8) spiral in the same direction.

18. The transmission according to claim 1, wherein an axial position of said first and second driving pinions (6, 8) is adjustable along their axes of rotation.

19. The transmission according to claims 1, wherein said first and second driving pinions (6, 8) and said first and second toothed output gears (2, 4) each have equal numbers of teeth and a ratio of the modules substantially corresponds to a (rolling) radial ratio.

20. The transmission according claim 1, wherein a transitory stage (18, 20) is provided on the input side.

21. The transmission according to claim 1, wherein the transmission has a third pinion (24) in constant engagement with one of said first and second toothed output gears (2, 4), and the third pinion (24) is a power take-off (56) which drives a for a tail rotor drive.

22. A transmission (30) for a helicopter rotor drive comprising:

a prime mover provided with at least first and second power transmission branches, and a housing (40) accommodating the first and second power transmissions;

the first power transmission branch having a first driving pinion (6) in constant meshing engagement with a first toothed output gear (2);

the second power transmission branch having a second driving pinion (8) in constant meshing engagement with a second toothed output gear (4), the second driving pinion (8) being co-axial with the first driving pinion (6), and the second toothed output gear (4) being positioned co-axial and non-rotatably connected to the first toothed output gear (2);

a first co-axial pinion shaft (10) supporting the first co-axial pinion (6); and a second co-axial pinion shaft (12) supporting the second co-axial pinion (8), the first and second co-axial pinion shafts having an interconnecting point (16) remote from the first and second driving pinions (6, 8);

wherein a sliding bearing is located between said second driving pinion (8) and said first pinion shaft (10), and the sliding bearing has races (42) integrated in said second driving pinion (8) and in said first pinion shaft (10; and a first end of the first pinion shaft (10) is supported by a first bearing (62) and a second opposed end of the first pinion shaft (10) is supported by a second bearing (64), with the first and second driving pinions (6, 8) located between the first and second bearings (62, 64), to facilitate rotation of the first and second pinion shafts (10, 12) relative to the housing (40).

* * * * *